United States Patent [19]

Bayle-Laboure et al.

[11] Patent Number: 4,577,814
[45] Date of Patent: Mar. 25, 1986

[54] VARIABLE SECTION NOZZLE FOR A TURBO-JET ENGINE AND AN AIRCRAFT COMPRISING SUCH EQUIPMENT

[75] Inventors: Gérard J. P. Bayle-Laboure, Avon; Jean G. Bouiller, Brunoy; Marc F. B. Buisson, Le Mee sur Seine; Marcel R. Soligny, Chevilly-Larue, all of France

[73] Assignee: Societe Nationale d'Etude et de Construction de Moteurs d'Aviation "S.N.E.C.M.A.", Paris, France

[21] Appl. No.: 554,301

[22] Filed: Nov. 22, 1983

[30] Foreign Application Priority Data

Dec. 8, 1982 [FR] France ................. 82 20530

[51] Int. Cl.⁴ .................. B64C 15/00; F02K 1/00
[52] U.S. Cl. ..................... 244/12.5; 244/52; 60/232; 60/242; 239/265.19
[58] Field of Search ........... 244/12.5, 23 D, 52, 244/73 R, 110 B; 239/265.19, 265.33, 265.35, 265.37; 60/228, 230, 232, 242

[56] References Cited

U.S. PATENT DOCUMENTS

| 2,420,323 | 5/1947 | Meyer et al. | 244/12.5 |
| 2,593,420 | 4/1952 | Diehl | 60/230 |
| 2,654,552 | 10/1953 | Jonas | 244/12.5 |
| 2,734,690 | 2/1956 | Straayer | 244/52 |
| 2,765,993 | 10/1956 | Custer | 244/52 |
| 3,019,601 | 2/1962 | Sens | 239/265.33 |
| 3,060,681 | 10/1962 | Morley | 60/230 |
| 3,262,645 | 7/1966 | Veno, Jr. | 244/52 |
| 3,387,788 | 6/1968 | Brown | 239/265.37 |
| 3,512,716 | 5/1970 | Kopp | 239/265.37 |
| 3,926,389 | 12/1975 | Mederer | 244/52 |
| 4,449,678 | 5/1984 | Hapke | 239/265.33 |

FOREIGN PATENT DOCUMENTS

| 2057002 | 5/1972 | Fed. Rep. of Germany | 244/12.5 |
| 1147262 | 11/1957 | France | 244/23 D |
| 1497418 | 8/1967 | France | 60/230 |
| 1306588 | 2/1973 | United Kingdom | 244/52 |

Primary Examiner—Trygve M. Blix
Assistant Examiner—Rodney Corl
Attorney, Agent, or Firm—Oblon, Fisher, Spivak, McClelland & Maier

[57] ABSTRACT

The invention relates to a variable area nozzle for a turbo-jet engine. This nozzle comprises a convergent portion, formed by a fixed semi-shell (2) and a semi-shell (3) pivotal about a diametral axis (4a-4b); the fluid-tightness of the convergent portion is ensured by a substantially semi-circular seal (6) and by two longitudinal seals (7a, 7b). The nozzle can be used for example with an engine comprising a partial re-heat system of moderate output.

9 Claims, 4 Drawing Figures

VARIABLE SECTION NOZZLE FOR A TURBO-JET ENGINE AND AN AIRCRAFT COMPRISING SUCH EQUIPMENT

BACKGROUND OF THE INVENTION

1. Field of the Invention

The present invention relates to a variable section nozzle for a turbo-jet engine, for example of the type comprising a partial re-heat system of moderate output and the invention also relates to an aircraft comprising such equipment.

2. Description of the Prior Art

A very large number of different types of variable section nozzle, for turbo-jet engines, are already known. For turbo-jet engines which utilize a re-heat system at high output, nozzles are generally known of which the variability of the section is provided by means of multiple blades or flaps. Nozzles having a complex structure, comprising several hydraulic actuators for the actuation of the various blades, and possibly mechanical means for synchronising the blades have also been proposed. Heavy, costly and very bulky constructions are involved which, moreover, often give rise to imperfect reliability, and necessitate periodic costly inspections.

Multiple blade nozzles of this kind are as a result poorly suited for the equipment of turbo-jet engines which only comprise a partial re-heat system of moderate output, particularly for reasons of weight and bulk.

British Patent Specification No. 1 306 588 describes a nozzle for a turbo-jet engine, which comprises a ring, which is coaxially mounted at the jet pipe outlet so as to be able to pivot on rails having a partially spherical profile. Multiple blades each controlled by a hydraulic actuator, are pivotally mounted on this ring, and they co-operate so as to form, in any position, a continuous wall of a nozzle of variable section. This construction has in practice all the disadvantages of multiple blade nozzles hereinbefore referred to.

French Patent Specification No. 1 497 418 describes a conical, variable-section, convergent-divergent nozzle, of the needle type. It comprises an inner bi-conical body, of which in particular the divergent part is formed by a folded thin metallic sheet following a frusto-conical surface, with overlap of its end edges, this sheet being capable of being wound up and unwound so as to cause a variation in the dimensions of the frustrum of a cone formed thereby. It has a very complex structure, and probably of low reliability.

SUMMARY OF THE INVENTION

According to the present invention, there is provided a variable section nozzle for a turbo-jet engine comprising a substantially frusto-conical convergent portion, including a fixed semi-shell adapted to be mounted downstream of the jet pipe and a movable semi-shell pivotally mounted about two pivots, aligned on a diametral axis of the outlet of the said jet pipe, and comprising means serving to pivot the movable semi-shell between two extreme positions, corresponding respectively to maximum and minimum openings of the convergent portion, the two semi-shells being arranged to co-operate at their longitudinal edges to provide fluid-tightness of the said convergent portion in all positions of the movable semi-shell.

The variable section nozzle according to the present invention thus has a particularly simple structure, comprising a single movable element, namely the pivotal semi-shell, of which the pivotal movements can be controlled for example by a single hydraulic actuator. It is therefore a particularly light nozzle, of low bulk and extremely serviceable. Its simple structure and its low bulk enables adaptation to a turbo-jet engine, which, by construction, was not provided with a re-heat system, and, as a result, include only a nozzle of non-variable section. In practice, in order to be able to apply to a turbo-jet engine a partial re-heat system of moderate output, it is sufficient to add to it a variable section nozzle according to the present invention, and, a hydraulic actuator in order to control the pivotal semi-shell, these additions giving rise to only a slight increase in the total weight of the turbo-jet engine and of its nozzle and a very slight increase in its bulk. This advantageous application to a turbo-jet engine without re-heat is made possible at low cost.

In a preferred embodiment of the nozzle according to the present invention, the upstream edge of the movable semi-shell is so arranged as to co-operate with a corresponding part of the downstream edge of the jet pipe, whilst providing fluid-tightness in all positions of the movable semi-shell, for example because the upstream part of the latter comprises internally a spherical seating, adapted to co-operate with a fluid-tight fixed seal externally of the edge of the said outlet. The longitudinal edges of the two semi-shells mutually overlap at plane parts, adapted to co-operate through the intermediary of longitudinal fluid-tight seals, secured to the edges of one of the semi-shells, so as to ensure fluid-tightness of the convergent portion in all positions of the movable semi-shell.

Whilst in the case of most known variable section nozzles, the variations in section, effected for example by synchronised movements of multiple pivotal blades, does not affect in practice the direction of the thrust of the jet, which remains generally always directed along the longitudinal axis of the engine. In the case, in contrast, of a turbo-jet engine provided with a variable section nozzle according to the present invention, the displacement of the movable semi-shell with respect to the fixed semi-shell gives rise to a small component of thrust perpendicular to the longitudinal axis of the latter, this component having clearly a maximum value when the movable semi-shell of the nozzle lies in one of the two extreme positions, generally in its position of maximum opening.

As a result, in the case of an aircraft comprising a single turbo-jet engine, disposed substantially in the longitudinal plane of symmetry of the aircraft, and provided with a nozzle in accordance with the present invention, the pivots of the movable semi-shell of the said nozzle are preferably disposed along an axis perpendicular to the plane of symmetry of the aircraft.

With this arrangement according to the present invention, the transverse component of the thrust of the turbo-jet which arises during displacements of the movable shell of the nozzle can be readily compensated by the pilot acting on the height controls of the aircraft, so as to avoid any change in the trim of the aircraft. Conversely, the pilot can modify the trim of the aircraft without actuating the corresponding controls, simply by causing a variation in the section of the nozzle, by the action of the corresponding hydraulic actuator, so as to produce a transverse component of the thrust of the turbo-jet engine.

In contrast, in the case of an aircraft comprising at least a pair of turbo-jet engines, disposed symmetrically with respect to the longitudinal plane of symmetry of the aircraft, and each provided with a nozzle in accordance with the present invention, the pivots of the movable semi-shells of the two nozzles are disposed preferably respectively along two axes parallel to the plane of symmetry of the aircraft, the two movable semi-shells being both disposed, either on the side of the plane of symmetry of the aircraft, or on the opposite side. It will be understood that in practice, with this arrangement, the consequential variations of respective sections of the nozzles will be translated by the generation of transverse components of the respective thrusts of the two turbo-jet engines, which are respectively equal and in the opposite sense, so that they are both self-cancelling, and that, the aircraft being subjected only to axial components of the two thrusts, in either direction, the trim will not be modified. On the contrary, with this arrangement, the pilot will be able slightly to change the direction of the aircraft without actuating the corresponding controls, simply by modifying the openings of the two nozzles in an asymmetrical manner, one of the two nozzles being maintained for example with its minimum opening, and the other nozzle being adjusted to its maximum opening.

BRIEF DESCRIPTION OF THE DRAWINGS

By way of example, there is described hereinafter and illustrated diagrammatically in the accompanying drawings, an embodiment of a nozzle of variable section according to the present invention, the drawings showing in.

DESCRIPTION OF THE PREFERRED EMBODIMENT

Figure 1:
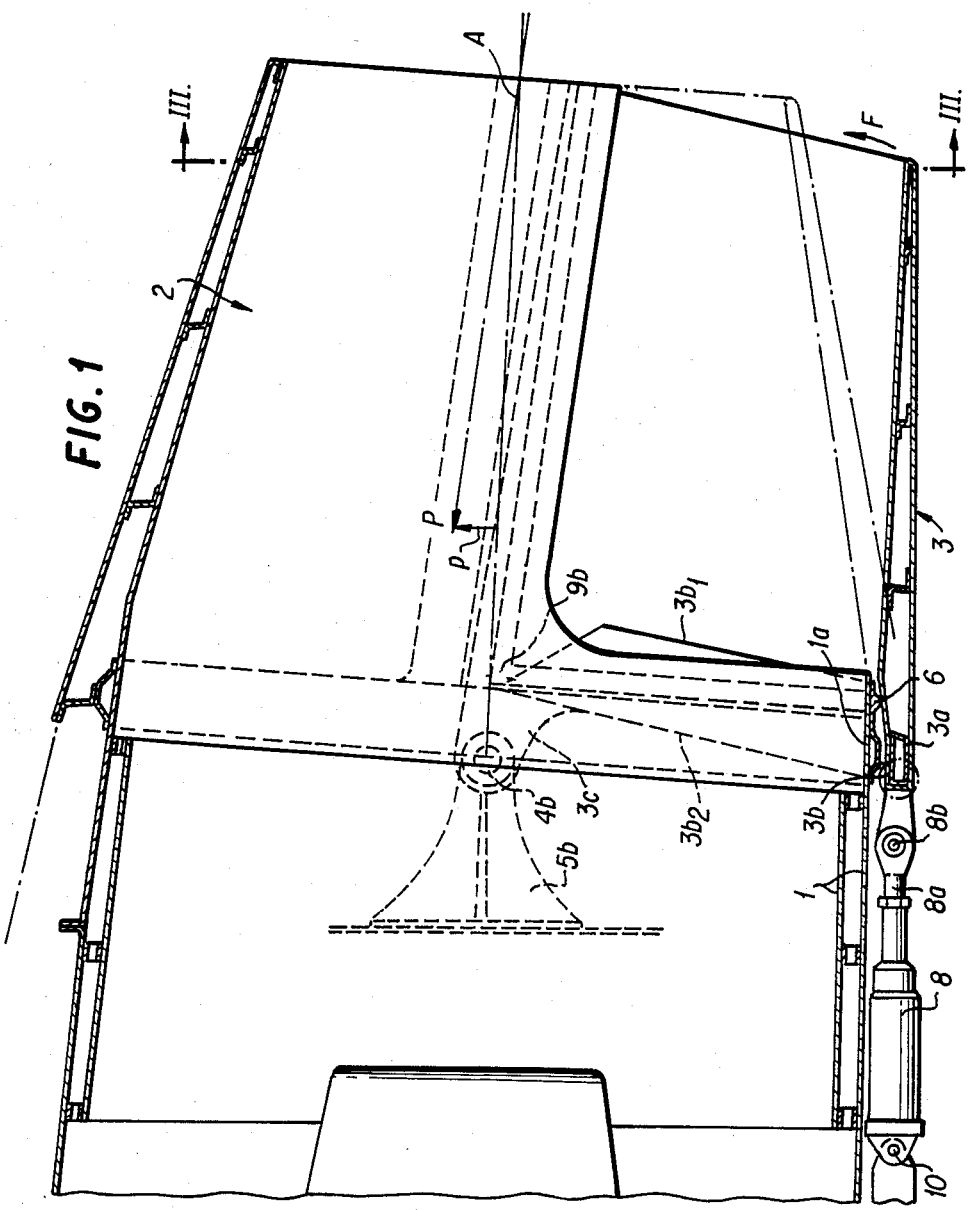
FIG. 1 a view in axial section of a nozzle embodying the present invention, mounted at the outlet of a turbo-jet engine.
Figure 2:
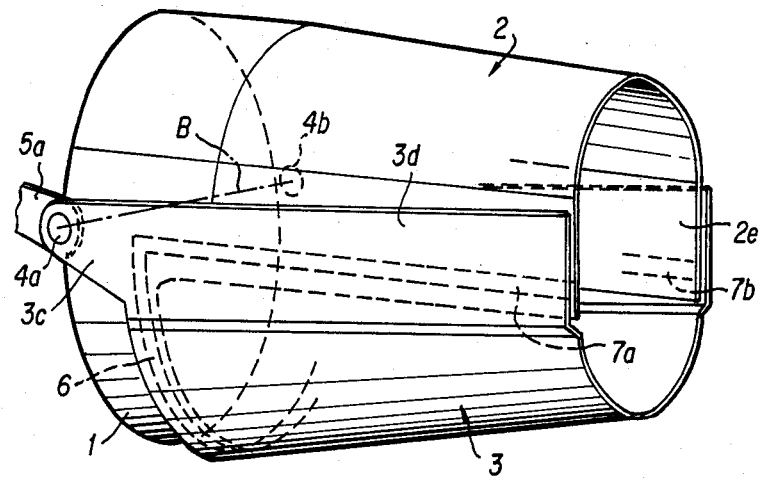
FIG. 2 is a diagrammatic view, in perspective, of the nozzle illustrated in FIG. 1.
Figure 3:
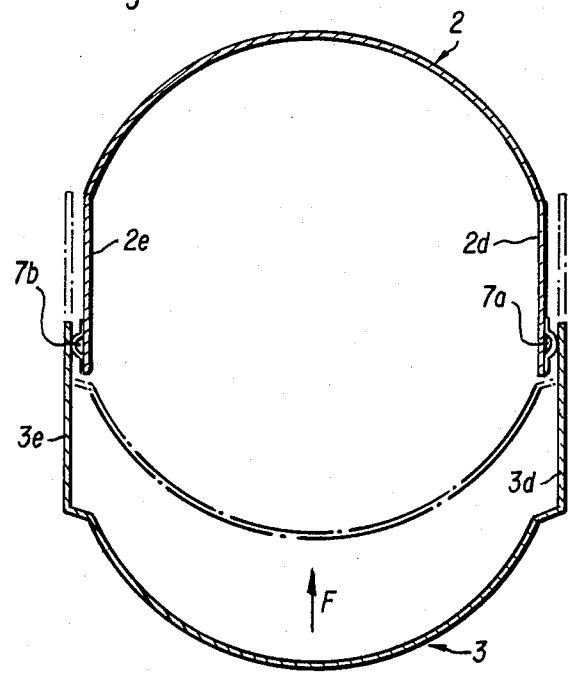
FIG. 3 is a view in section along the line III—III of FIG. 1.

In FIGS. 1 to 3 of the accompanying drawings, 1 designates the double wall of the jet pipe of a turbo-jet engine (not shown), which supplies the hot gases to the nozzle which will be described hereinafter.

The nozzle is constituted essentially by a substantially frusto-conical convergent portion, of which the axis A is aligned with, or alternatively slightly inclined to the axis of the turbo-jet engine. The frusto-conical convergent portion comprises a fixed semi-shell 2 which is mounted on an extension of the jet pipe 1 and a movable semi-shell 3 which is pivotally mounted about two lateral pivots 4a and 4b, these two lateral pivots being aligned on a diametral axis B (FIG. 2) at the outlet of the jet pipe 1.

The upstream edge 3a of the movable shell 3 is so arranged as to co-operate with the corresponding part of the edge of the outlet of the jet pipe 1 whilst providing fluid-tightness in all positions of the semi-shell 3. As will be seen particularly in the lower part of FIG. 1, the upstream edge 3a of the semi-shell 3 surrounds the corresponding part 1a of the edge of the outlet of jet pipe 1 and it comprises internally a spherical seating 3b of which the downstream and upstream edges have been respectively designated by 3b1 and 3b2. The spherical seating 3b which surrounds the part 1a of the edge of the outlet of the jet pipe 1 over slightly less than 180° and has ends which are respectively connected to the pivots 4a and 4b by extensions in the form of tongues, such as 3c in FIGS. 1 and 2. The pivots 4a and 4b are themselves supported by supports 5a and 5b which are secured to the outside of the wall of the jet pipe 1 adjacent to its downstream edge and which transfers peripherally into the jet pipe the forces imposed by the movable shell 3 on the pivots 4a and 4b.

Furthermore, a fluid-tight seal 6 is secured externally adjacent to the edge of the jet pipe 1 so as to co-operate with the spherical seating 3b which is provided on the corresponding part 3a of the movable semi-shell 3 in all positions of the latter. It will be understood that the seal 6 can be provided only on the lower half of the edge of the duct outlet, so as to extend over about 180° and in the construction shown, it is clearly disposed slightly downstream of the transverse plane containing the pivots 4a and 4b.

As is apparent in the sectional view of FIG. 3, the longitudinal edges of the two semi-shells 2 and 3 mutually overlap at plane edge parts 2d and 3d, and 2e and 3e adapted to co-operate through the intermediary of fluid-tight longitudinal seals such as 7a and 7b (in broken lines in FIGS. 1 and 2), which are secured to the edges of one of the semi-shells, so as to ensure fluid-tightness of the convergent portion in all positions of the movable semi-shell 3. In the embodiment illustrated in FIG. 3, it is each of the longitudinal plane edge parts 3d or 3e of the movable semi-shell 3, which overlaps externally the longitudinal plane edge parts 2d or 2e of the fixed semi-shell 2 and the longitudinal seal 7a or 7b is secured externally on the said plane edge parts 2d or 2e respectively.

A hydraulic actuator 8 is mounted below the lower part of the jet pipe 1. The body of the actuator is provided at 10 to a fixed support on the jet pipe upstream of the edge 3a of the movable shell and the downstream end of the piston rod 8a of this actuator is pivoted at 8b to the upstream edge 3a of the movable shell. As will be understood, there will be provided between the body of the actuator and the duct 1 as sufficient clearance to enable the extension of the actuator, between the fully closed position and the fully open position of the shell and preferably, in order to reduce the risks of transverse forces on the movable part of the actuator in case of position tolerance or deformations, the pivots 8b and 10 will comprise spherical joints.

The operation of the nozzle, which has just been described, is as follows:

When the rod 8a of the hydraulic actuator 8 is in its fully retracted position, illustrated in FIG. 1, the movable semi-shell 3 occupies the position indicated in full lines in the same Figure, a position which corresponds to the maximum opening of the nozzle. The hot gases delivered from the jet pipe 1 into the nozzle can only exhaust through the downstream opening, because of the fluid-tightness provided both by the contact of the spherical seating 3b of the semi-shell 3 in the region of its edge 3b1 with the semi-circular seal 6 and by the longitudinal seals 7a and 7b interposed between the longitudinal plane edge parts 2d and 3d, 2e and 3e of the two semi-shells 2 and 3 as illustrated in full lines in FIG. 3.

When the section of the nozzle is to be reduced, the hydraulic actuator 8 is operated so that the rod 8a, on initially leaving the body of the actuator, displaces the upstream edge 3a of the movable shell towards the downstream end, which gives rise to pivoting of the movable semi-shell 3 about its two pivots 4a and 4b in the direction of the arrow F indicated in FIGS. 1 and 3. In these two Figures, the extreme position has also been indicated in double chain lines of the movable semi-shell 3, corresponding to the minimum opening of the nozzle, for which, in the embodiment considered, the convergent portion formed by the semi-shells 2 and 3 has exactly the shape of a frustum of a cone of revolution on the axis A. In the course of pivotal movement of the semi-shell 3 about its pivots 4a and 4b the fluid-tightness of the nozzle continues to be provided at the semi-circular seal zone 6 owing to the fact that the spherical seating 3b of the movable semi-shell 3 remains applied against the said semi-circular seal 6 at all the points of the latter, that is to say slightly less than 180°, the line or narrow strip of contact between the seal 6 and the spherical seating 3b progressively displacing from the edge 3b1 of the said spherical seating 3b to the vicinity of its edge 3b2 for the minimum opening position of the nozzle.

Similarly, the fluid-tightness of the nozzle does not cease to be provided, during the pivotal movement of the movable semi-shell 3 in the zone of the longitudinal seals 7a and 7b since, as is seen in FIG. 3 during the pivotal movement of the movable semi-shell 3 in the direction of the arrow F, each plane edge part 3d or 3e of the latter is displaced upwardly, without ceasing to be in fluid-tight contact with the seal 7a or 7b, the line or the narrow strip of contact with the seal 7a or 7b being displaced only from the visible position in FIG. 3 towards a position closer to the concave part of the semi-shell 3.

Preferably, the upstream ends of the longitudinal seals 7a and 7b are reunited without breaking the continuity at the corresponding ends of the semi-circular seal 6, as indicated at 9b in FIG. 1, so as to provide sufficient fluid-tightness for the positions of the movable semi-shell 3 intermediate the two extreme positions referred to.

As has been indicated hereinbefore, the nozzle 2-3 only has revolutionary symmetry about the axis A in its minimum opening position, for which the movable semi-shell 3 occupies the position indicated in broken lines. For all positions of the movable semi-shell 3 corresponding to a larger opening of the nozzle, the latter no longer has revolutionary symmetry about the axis A and in fact the thrust produced by the turbo-jet engine, equipped with the nozzle, has a direction P slightly inclined to the axis of symmetry A. In the illustrated example in FIG. 3, the thrust P is exerted in the plane of FIG. 1, and, for the maximum opening position of the movable semi-shell 3, it has a small transverse component p, that is to say perpendicular to the axis A and as a result perpendicular to the axis of the pivots 4a and 4b, this transverse thrust component p being directed in the opposite direction to the displacement of the movable semi-shell 3.

In the preferred embodiment, the axis of the pivots 4a and 4b is perpendicular to the longitudinal plane of symmetry of the aircraft, the transverse component p of the thrust P produced by the engine in the opening position of the nozzle is disposed in the said plane of symmetry and directed upwardly or downwardly according to whether the movable semi-shell of the said nozzle lies above or below the axis A (FIG. 1), and it is then always possible to compensate the effect of the said transverse component p on the trim of the aircraft by acting in an appropriate sense on the height controls.

It will be understood, that the generation of a transverse component p of the thrust P of the engine when actuator 8 produces an increase in the opening of the nozzle can be put to good use by the pilot for modifying the trim of the aircraft without actuating the corresponding controls or in order to increase the action of the controls.

As indicated hereinbefore, and in particular in the case of a single engined aircraft, it is preferable that the axis of the pivots 4a and 4b should be perpendicular to the plane of symmetry of the aircraft. In an alternative arrangement the axes of the pivots are parallel to the plane of symmetry of the aircraft (or an intermediate position) if it is desired to make use of the component of thrust, or its absence, in order to modify the heading of the aircraft without action on the directional controls (or with a reduced action on this control). For a single engined aircraft, for example, the nozzle in the closed position will be slightly offset to one side of the aircraft, so that the thrust will be approximately in a direction symmetrical with respect to the axis of the aircraft, from the direction which the thrust is intended, in the position where the shell 3 is open.

Figure 4:
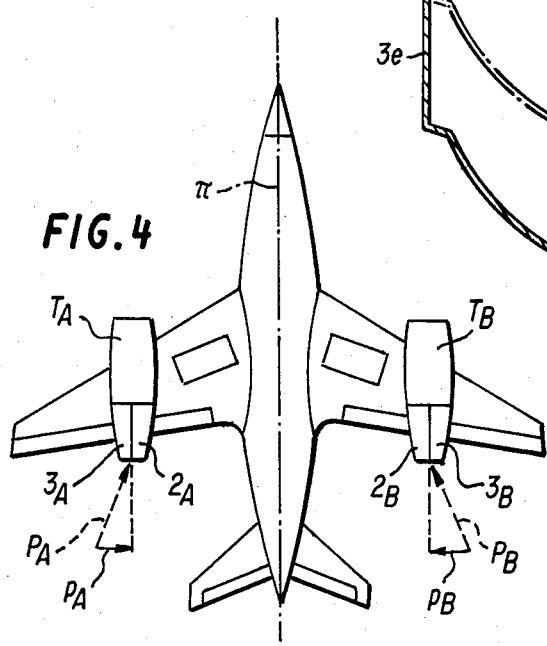
FIG. 4 is a diagrammatic view, in plan, of an aircraft comprising a pair of turbo-jet engines, each provided with a nozzle according to the present invention.

For a twin engined aircraft, for example, reference should be made to FIG. 4 which is a diagrammatic view, in plan, of an aircraft comprising a pair of turbo-jet engines $T_A$ and $T_B$ which are disposed symmetrically with respect to the longitudinal plane of symmetry $\pi$. Each of the jet engines $T_A$ and $T_B$ is equipped with a nozzle, for example as hereinbefore described with reference to FIGS. 1 to 3, the pivots of their movable semi-shells $3_A$ and $3_B$ being disposed respectively on axes parallel to the plane of symmetry $\pi$ of the aircraft, and the two movable semi-shells $3_A$ and $3_B$ both being disposed on the opposite side of the plane of symmetry $\pi$. It will be understood that, with this arrangement, when the two nozzles are open to an equal degree, that is to say generally both open or both closed, the engines $T_A$ and $T_B$ will generate respectively thrusts $P_A$ and $P_B$ which are equally inclined to the plane of symmetry $\pi$, their transverse respective components $p_A$ and $p_B$ being furthermore both in the opposite sense, although their respective effects on the heading of the aircraft will cancel one another. This arrangement thus avoids the need for the pilot of the aircraft to compensate for the transverse components $p_A$ and $p_B$ of the thrusts of the engine while acting on the directional controls of the aircraft to achieve change in trim or heading. However, the pilot of the aircraft has the supplementary possibility to control differentially the respective openings of the two nozzles, so as to give different values to their respective transverse components. Under these conditions, the resultant of the transverse, unequal, components, is no longer zero, and it applies to the aircraft a couple which tends to modify its heading. The pilot can use this arrangement in order to provide rapid changes in the heading of the aircraft without actuating the corresponding controls. Similar results will be obtained if the respective positions of the fixed semi-shells $2_A$ and $2_B$ and of the movable semi-shells $3_A$ and $3_B$ were exchanged, the transverse components $p_A$ and $p_B$ then having only the opposite sense to those shown in FIG. 4.

In place of being fixed to the longitudinal plane edge parts 2d or 2e of the fixed semi-shell 2, the longitudinal seals 7a and 7b can be secured on the longitudinal plane edge parts 3d or 3e of the movable semi-shell 3. In place of being external to the edges of the longitudinal plane edge parts 2d or 2e of the fixed semi-shell 2, the longitudinal plane edge parts 3d or 3e of the movable semi-shell 3 can be disposed within the fixed semi-shell. The construction of means to cause the movable semi-shell 3 to pivot between its two extreme positions is optional. The spherical seating 3b (FIG. 1), instead of being concave and supported by the upstream edge of the movable semi-shell 3, can be convex and secured about one half of the interior of the edge 1a of the jet pipe 1, so as to co-operate with a semi-circular seal which will then be rigid with the upstream corresponding edge of the movable semi-shell.

We claim:

1. A variable section nozzle for a turbo-jet engine comprising
   means defining a substantially frusto-conical convergent duct including
   a fixed semi-shell arranged to be secured to the jet pipe of an aircraft engine,
   a pivotal semi-shell mounted for pivotal movement about a diametral axis transverse to the longitudinal axis of the jet pipe,
   the semi-shells together defining the nozzle and having generally coincident longitudinal edge portions in opposed pairs, said longitudinal edge portions of both of said shells being plane and overlapping, and
   means for ensuring fluid-tightness of the semi-shells at the longitudinal edge portions in all poritions of the pivotal semi-shell, and including
   means for pivoting the pivotal semi-shell between two extreme positions corresponding to maximum and minimum openings of the nozzle.

2. A nozzle according to claim 1 comprising means at the upstream edge portion of the pivotal semi-shell serving to co-operate with a corresponding edge portion of the outlet of the engine jet pipe whereby to provide a fluid-tight seal between these portions in all positions of the pivotal semi-shell.

3. A nozzle according to claim 2, wherein the upstream edge portion of the pivotal semi-shell surrounds the said edge portion of the jet pipe and the fluid-tight seal means comprises an internal spherical seating on the pivotal semi-shell and a fluid-tight seal mounted externally on said edge portion of the jet pipe.

4. A nozzle according to claim 1, wherein the means for ensuring fluid-tightness of the semi-shell comprise seals secured to the edge portions of the semi-shells.

5. A nozzle according to claim 4, wherein the plane longitudinal edge portions of the pivotal semi-shell overlap externally the plane longitudinal edge portions of the fixed semi-shell, the said longitudinal seals being mounted externally on the fixed semi-shell.

6. An aircraft comprising
   a single turbo-jet engine disposed substantially in the longitudinal plane of symmetry of the aircraft, said engine having
   a jet pipe, and
   a variable section nozzle secured to the jet pipe, said nozzle comprising
   means for defining a substantially frusto-conical convergent duct including
   a fixed semi-shell arranged to be secured to the jet pipe of an aircraft engine,
   a pivotal semi-shell mounted for pivotal movement about a diametral axis-transverse to the longitudinal axis of the jet pipe,
   the semi-shells together defining a nozzle and having generally coincident longitudinal edge portions in opposed pairs, said longitudinal edge portions of both of said shells being plane and overlapping, and
   means for ensuring fluid-tightness of the semi-shells at the longitudinal edge portions in all positions of the pivotal semi-shell, and including
   means for pivoting the semi-shell between two extreme positions corresponding to maximum and minimum openings of the nozzle,
   the pivot axis of the pivotal semi-shell extending perpendicularly to the said plane of symmetry of the aircraft.

7. An aircraft comprising
   a single turbo-jet engine disposed substantially in the longitudinal plane of symmetry of the aircraft, said engine having
   a jet pipe, and
   a variable section nozzle secured to the jet pipe, said nozzle comprising
   means for defining a substantially frusto-conical convergent duct including
   a fixed semi-shell arranged to be secured to the jet pipe of an aircraft engine,
   a pivotal semi-shell mounted for pivotal movement about a diametral axis transverse to the longitudinal axis of the jet pipe,
   the semi-shells together defining a nozzle and having generally coincident longitudinal edge portions in opposed pairs, said longitudinal edge portions of both of said shells being plane and overlapping, and
   means for ensuring fluid-tightness of the semi-shells at the longitudinal edge portions in all positions of the pivotal semi-shell, and including
   means for pivoting the pivotal semi-shell between two extreme positions corresponding to maximum and minimum openings of the nozzle,
   the pivot axis of the pivotal semi-shell lying in the plane of symmetry of the aircraft.

8. An aircraft comprising
   at least one pair of turbo-jet engines disposed symmetrically with respect to the longitudinal plane of symmetry of the aircraft, each engine having
   a jet pipe, and
   a variable section nozzle secured to the jet pipe, each said nozzle comprising
   means for defining a substantially frusto-conical convergent duct including
   a fixed semi-shell arranged to be secured to the jet pipe of an aircraft engine,
   a pivotal semi-shell mounted for pivotal movement about a diametral axis transverse to the longitudinal axis of the jet pipe,
   the semi-shells together defining the nozzle and having generally coincident longitudinal edge portions in opposed pairs, said longitudinal edge portions of both of said shells being plane and overlapping, and
   means for ensuring fluid-tightness of the semi-shells at the longitudinal edge portions in all positions of the pivotal semi-shell, and including
   means for pivoting the pivotal semi-shell between two extreme positions corresponding to maximum and minimum openings of the nozzle,
   the pivot axis of the pivotal semi-shell lying in a plane parallel to the said plane of symmetry of the aircraft.

9. An aircraft according to claim 8, wherein the pivotal semi-shells are both disposed adjacent to the said plane of symmetry.

* * * * *